United States Patent
Lewis

(10) Patent No.: US 7,239,326 B2
(45) Date of Patent: *Jul. 3, 2007

(54) METHOD AND SYSTEM FOR PROVIDING EDGE ANTIALIASING

(75) Inventor: Michael C. Lewis, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 176 days.

This patent is subject to a terminal disclaimer.

(21) Appl. No.: 11/013,581

(22) Filed: Dec. 16, 2004

(65) Prior Publication Data

US 2005/0093883 A1 May 5, 2005

Related U.S. Application Data

(63) Continuation of application No. 09/589,573, filed on Jun. 7, 2000, now Pat. No. 6,906,728, which is a continuation of application No. 09/239,413, filed on Jan. 28, 1999, now abandoned.

(51) Int. Cl.
*G09G 5/00* (2006.01)

(52) U.S. Cl. .................. 345/611; 345/419; 345/421; 345/422; 345/423; 345/505; 345/535; 345/555; 345/626

(58) Field of Classification Search ............... 345/419, 345/421, 422, 423, 505, 535, 555, 611, 626

See application file for complete search history.

(56) References Cited

U.S. PATENT DOCUMENTS

| | | |
|---|---|---|
| 4,918,626 A | 4/1990 | Watkins et al. |
| 5,408,606 A | 4/1995 | Eckart |
| 5,684,939 A | 11/1997 | Foran et al. |
| 5,872,902 A | 2/1999 | Kuchkuda et al. |

*Primary Examiner*—Kimbinh T. Nguyen
(74) *Attorney, Agent, or Firm*—McAndrews, Held & Malloy, Ltd.

(57) ABSTRACT

A system and method for generating a graphical image on a display is disclosed. The graphical image is generated from data describing at least one object. The display includes a plurality of positions. Each of the plurality of positions has an area. The system and method include determining if a portion of the at least one object intersects a current position of the plurality of positions and providing an output if the portion intersects the current position. The method and system further include providing a mask for the portion if it is determined that the portion intersects the current position. The mask indicates an extent to which the at least one portion occupies the area of current position. The method and system further include utilizing the mask to provide antialiasing. The method and system also include repeating the determining, one mask providing, and utilizing steps for each of the plurality of positions.

15 Claims, 6 Drawing Sheets

FIG.7A

| 201 | 202 | 203 | 204 |
|---|---|---|---|
| 205 | 206 | 207 | 208 |
| 209 | 210 | 211 | 212 |
| 213 | 214 | 215 | 216 |

|   |   | 1 |   |
|---|---|---|---|
|   |   | 1 |   |
|   | 1 | 1 | 1 |
| 1 | 1 | 1 | 1 |

|   |   |   | 1 |
|---|---|---|---|
|   |   | 1 | 1 |
|   | 1 | 1 | 1 |
| 1 | 1 | 1 | 1 |

240

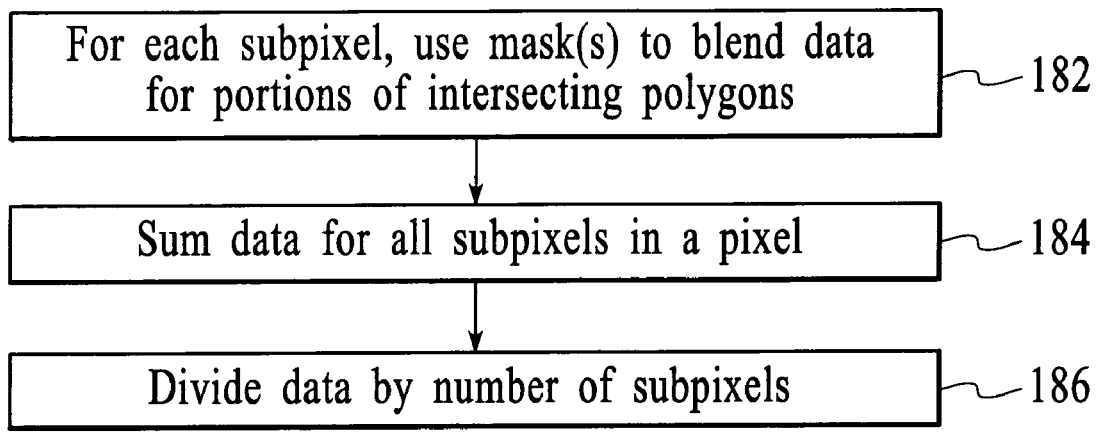
FIG.8    180
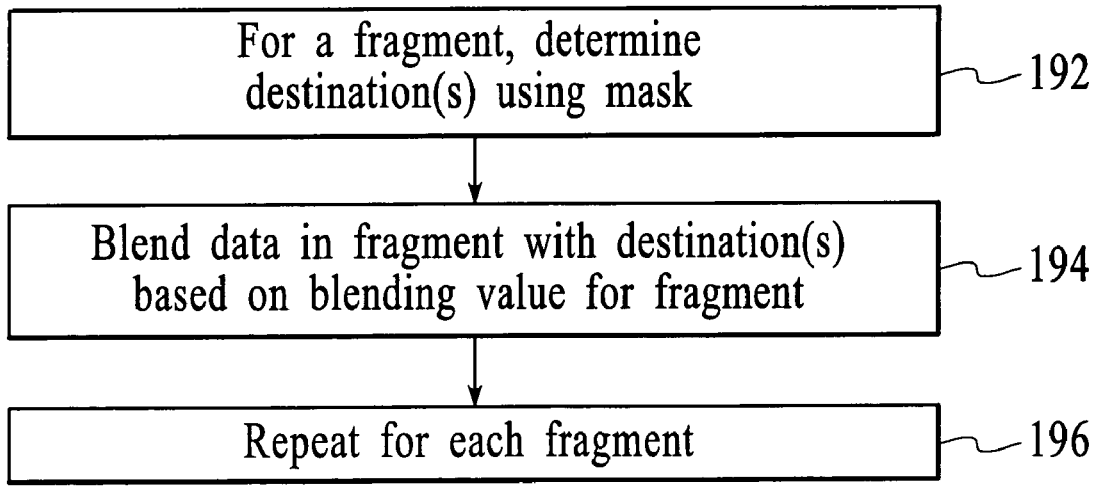
FIG.9    190

METHOD AND SYSTEM FOR PROVIDING EDGE ANTIALIASING

CROSS-REFERENCE TO RELATED APPLICATIONS

The present application is a continuation of and claims priority to U.S. patent application Ser. No. 09/589,573, filed Jun. 7, 2000 (now U.S. Pat. No. 6,906,728), which is a continuation of U.S. patent application Ser. No. 09/239,413 filed Jan. 28, 1999 (now abandoned). The present application is related to U.S. patent application Ser. No. 08/624,261 entitled "Method and Apparatus for Identifying and Eliminating Three-dimensional Objects Visually Obstructed from a Planar Surface" filed on Mar. 29, 1996 (now U.S. Pat. No. 5,926,181). The present application is also related to U.S. patent application Ser. No. 08/624,260 entitled "Graphics Processors, System and Method for Generating Screen Pixels in Raster Order Utilizing a Single Interpolator" filed on Mar. 29, 1996 (now U.S. Pat. No. 5,963,210). The present application is also related to co-pending U.S. patent application Ser. No. 09/583,063 entitled "Method and System for Providing a Hardware Sort in a Graphics System" filed on May 30, 2000.

FIELD OF THE INVENTION

The present invention relates to displaying objects on a computer system and more particularly to a method and system for edge antialiasing which provides reduced staircasing while maintaining processing speed and using a reduced amount of memory.

BACKGROUND OF THE INVENTION

A conventional computer graphics system can display objects on a display. The display includes a plurality of display elements, known as pixels, typically arranged in a grid. In order to display objects, the conventional computer graphics system typically breaks each object into a plurality of polygons. A conventional system then typically renders the polygons in a particular order. For a three-dimensional scene, the polygons are generally rendered from back to front as measured from the viewing plane of the display. Similarly, a two-dimensional scene can be displayed where polygons are rendered based on their layer. Deeper layers are occluded by shallower layers.

When rendering each polygon, the conventional system often renders diagonal lines or polygons which have edges that are not perfectly horizontal or vertical. When a diagonal line is rendered, pixels not directly above or next to each other are used to render the line. However, each pixel is not a point. Instead, each pixel has physical dimensions. For example, consider each pixel to be a square. As a result, a diagonal line will not appear smooth. Instead, the edges of the line will appear jagged, similar to a staircase. This effect is known as aliasing. Aliasing may appear for similar reasons at edges of a polygon. In order to reduce this effect, conventional systems perform antialiasing. Antialiasing helps reduce the effect that the physical dimension of the pixels has on the appearance of objects being displayed.

Several conventional mechanisms are used to perform antialiasing. Each mechanism has its drawbacks. One conventional mechanism determines the color for a pixel across which an edge lies by blending the colors of polygons existing at a pixel. The blending value for each polygon is used to determine how much the polygon will contribute to the color of a particular pixel. The polygon occupies only a fraction of the area for a pixel on which the edge of the polygon lies. Because the polygon contributes only a fraction of the color for such a pixel, the color of the polygon is blended with the remaining colors for the pixel. As a result, staircasing is reduced. However, some of the polygons at a pixel or the background may be obstructed. These polygons or the background still have a blending value which allows them to contribute to the color of a pixel. As a result, the color of the obstructed polygon is displayed to a user. This effect is known as edge bleeding and is undesirable.

A second conventional mechanism for antialiasing is to render a polygon multiple times. Each time the polygon is rendered, the polygon is shifted slightly. Similarly, a polygon can be inflated slightly. The edges of the inflated polygon are translucent. As a result, the edges are blurred and staircasing is reduced. However, because the polygon is shifted each time it is rendered, the entire polygon appears blurred. In addition, bleed through can occur at the edges.

A third conventional mechanism for antialiasing is known as supersampling. Each pixel is considered to be an M×N matrix of subpixels. Data for each polygon is evaluated at each subpixel. Finally, data for each subpixel in a pixel is combined to provide the data for each pixel in the polygon. As a result, aliasing is reduced. However, in order to perform supersampling, much more data is processed for each pixel. For example, a pixel broken into M×N subpixels will require M*N the amount of processing as a pixel which is not supersampled. Consequently, processing is slowed. Furthermore, supersampling is typically performed for a portion of the display, called a tile, or the entire display at a time. Each pixel in the tile or display has M×N subpixels. Thus, the system requires enough memory to retain data for M×N subpixels for each pixel in a tile. Therefore, a large amount of memory is required. If only a tile is rendered, then it must be ensured that there are not artifacts at the seam between tiles. Thus, processing is again slowed.

A fourth conventional mechanism for antialiasing uses an accumulation buffer ("A-buffer") and is known as an A-buffer technique. Data for each pixel in each polygon is processed. During processing, a mask is provided for each pixel in each polygon. The mask indicates the portion of the pixel covered by the polygon. A linked list is then provided for each pixel. The linked list links polygons that are associated with each pixel to the pixel. To link polygons, the linked list typically holds a mask, a color value, and other data relating to each polygon's potential contribution to the display of the pixel. After the entire scene has been stored in the A-buffer, the linked list is then traversed in order to accumulate and render data from the polygons associated with each pixel. Aliasing is thereby reduced. However, the A-buffer technique also has its drawbacks. Two passes are made through the data in order to render objects to the display. The first pass is to provide the masks for each polygon and to associate the polygons with particular pixels. The second pass utilizes the data stored for each pixel to determine how data for each pixel is to be displayed. Thus, this mechanism is time consuming. The linked list must also be managed by the computer graphics system, making the A-buffer technique more difficult to implement. Typically both an A-buffer and a frame buffer are used in rendering the scene. Therefore, the A-buffer technique also requires additional memory.

A fifth technique for antialiasing finds the edges of each polygon being rendered. Antialiased lines or lines having some transparency are then drawn over the edges. This may give the appearance of the polygon edge being smooth. To avoid edge bleeding, the application must indicate "silhouette" edges, which are time consuming to calculate.

Accordingly, what is needed is a system and method for more efficiently providing antialiasing. The present invention addresses such a need.

SUMMARY OF THE INVENTION

The present invention provides a system and method for generating a graphical image on a display. The graphical image is generated from data describing at least one object. The display includes a plurality of positions. Each of the plurality of positions has an area. The system and method comprise determining if a portion of the at least one object intersects a current position of the plurality of positions and providing an output if the portion intersects the current position. The method and system further comprise providing a mask for the portion if it is determined that the portion intersects the current position. The mask indicates an extent to which the portion occupies the area of current position. The method and system further comprise utilizing the mask to provide antialiasing. The method and system also include repeating the determining, mask providing, and utilizing steps for each of the plurality of positions.

According to the system and method disclosed herein, the present invention efficiently reduces staircasing without introducing additional visual artifacts, such as edge bleeding and blurring of the image, and without requiring brute force super-sampling. The present invention may also use less memory. Overall image quality is thereby increased without significant performance impact.

BRIEF DESCRIPTION OF THE DRAWINGS

FIG. 7A is a schematic diagram of a pixel in the display of a computer graphics system in accordance with the present invention.

FIG. 7B is a schematic diagram of a mask for one portion of a first polygon intersecting the pixel in the display of a computer graphics system in accordance with the present invention.

FIG. 7C is a schematic diagram of a mask for one portion of a second polygon intersecting the pixel in the display of a computer graphics system in accordance with the present invention.

FIG. 8 is a flow chart of one embodiment of a method for providing antialiasing in accordance with the present invention.

FIG. 9 is a flow chart of another embodiment of a method for blending in accordance with the present invention.

DETAILED DESCRIPTION OF THE INVENTION

The present invention relates to an improvement in computer graphics system, particularly systems used to depict three-dimensional objects on a two-dimensional display. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
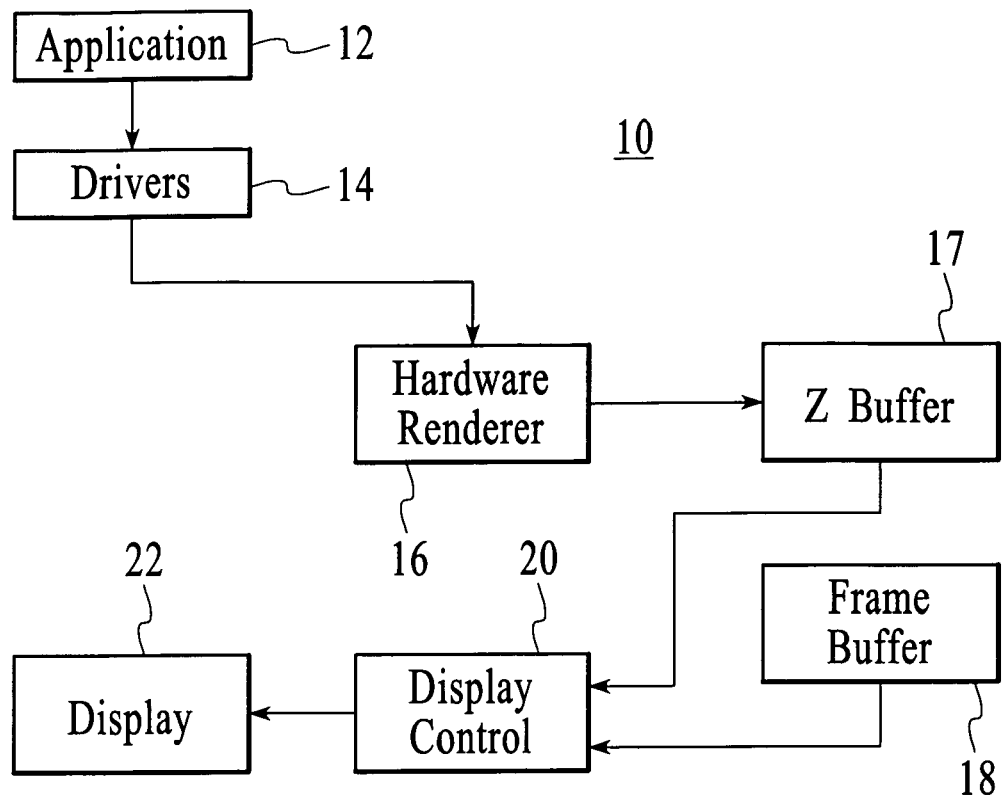
FIG. 1 is a block diagram of a conventional computer graphics system which may be used to depict three-dimensional objects on a two-dimensional display.

FIG. 1 depicts a block diagram of a conventional system 10 for providing a graphical display. In particular, the conventional system 10 may be used to provide a two-dimensional display of three-dimensional objects. Typically, the three-dimensional objects are broken into polygons, such as triangles, for display. A software application 12 is used to display the polygons. The application 12 calls drivers 14 which create a display list. The display list contains the x, y, and z coordinates, alpha or blending value, color, and other information for each polygon. The display list also lists the information relating to each polygon in the order in which the polygons will be rendered to the display 22. Note that the z coordinate may represent a depth. The depth can represent a variety of mechanisms for occluding portions of the scene. For example, z may refer to a distance from a viewing plane in a three-dimensional scene or may represent a layer order in a two-dimensional scene.

Once the polygons are properly ordered in the display list, a hardware renderer 16 begins the process of rendering the polygons to the display 22. The display list is provided to the hardware renderer 16, which prepares data relating to the polygons for display. The hardware renderer 16 creates a z buffer 17 and a frame buffer 18 to store data relating to each of the polygons. The z buffer 17 includes the z-values for each pixel in the polygon. The frame buffer 18 includes the colors for each pixel in the polygon. For each polygon on the display list, data from the z buffer 17 and frame buffer 18 are then provided to the display controller 20. The display controller 20 then outputs the data on the display 22. The polygons could be rendered in any order. For example, for efficiency, opaque polygons are typically desired to be rendered from front, or close to the viewing plane, to back, or far from the viewing plane. On the other hand, translucent polygons are typically desired to be rendered from back to front. In addition, the system 10 typically completes rendering one polygon before commencing rendering the next polygon.

Figure 2:
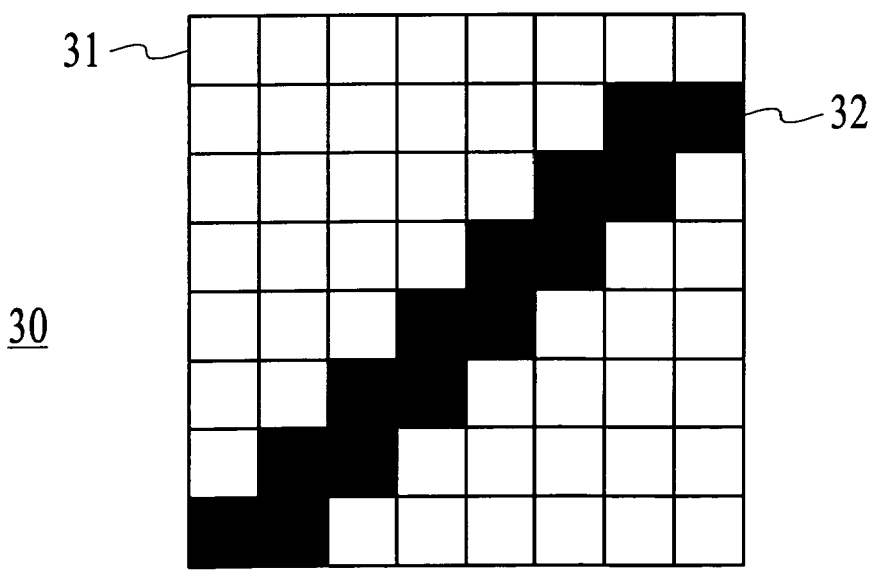
FIG. 2 is a diagram of a conventional display of a diagonal line.

FIG. 2 depicts a close-up view of a portion 30 of the display 22. The portion 30 of the display 22 includes a grid of sixty-four pixels 31. Note, however, that only one of the pixels 31 is labeled. Although the pixels 31 in the portion 30 of the display 22 are depicted as square, this shape is chosen for ease of explanation. A diagonal line 32 is drawn across the portion 30 of the display 22. Although depicted as a line, the line 32 could be an edge of a polygon. Because each pixel 31 has finite physical dimension, the line 32 does not have smooth edges. Instead, the line 32 is jagged, having a staircase appearance. This phenomenon is known as aliasing.

Figure 3:
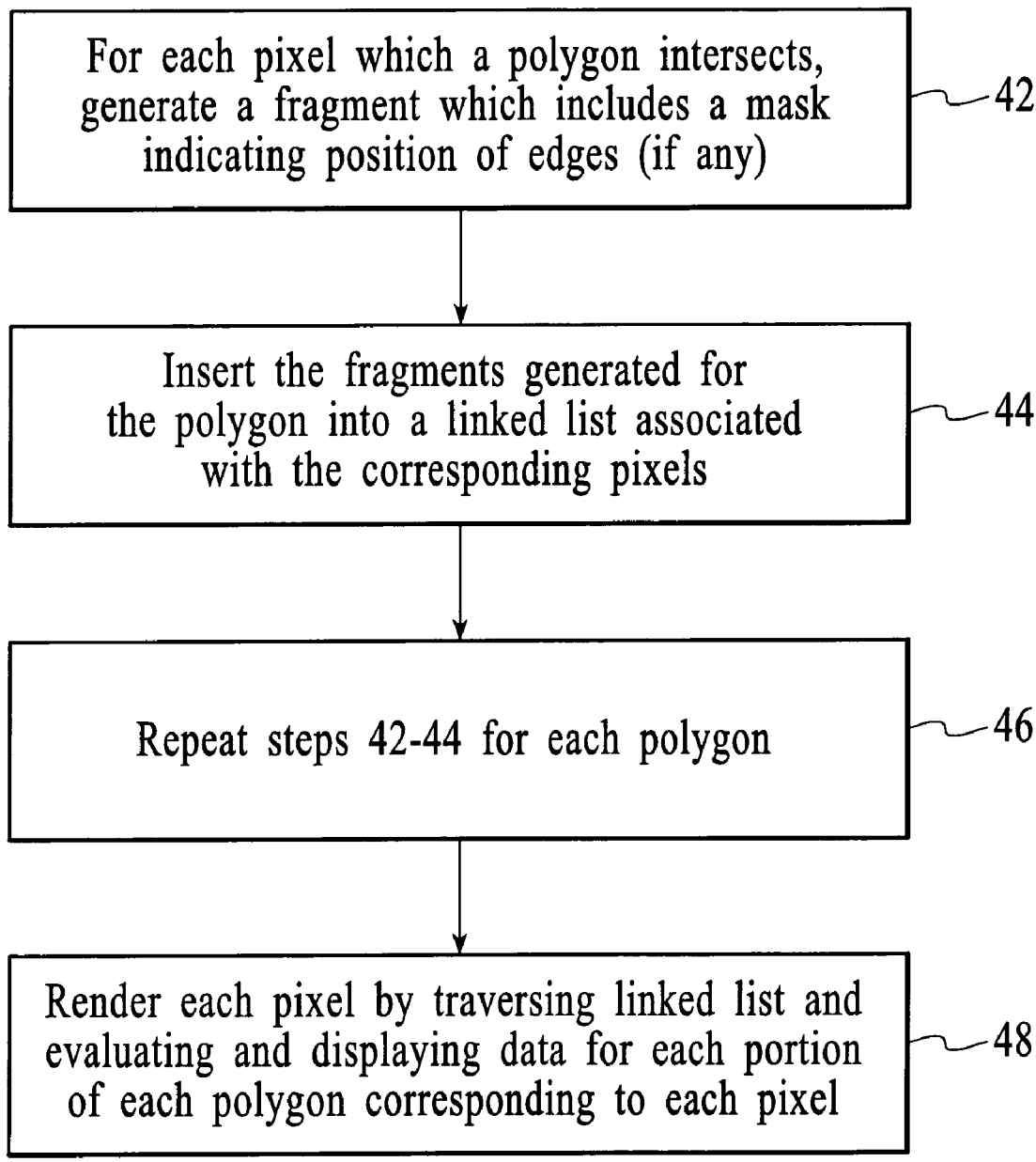
FIG. 3 is a flow chart depicting a conventional antialiasing method using an A-Buffer technique.

The conventional system 10 depicted in FIG. 1 may utilize a variety of mechanisms to reduce aliasing. The effort to reduce aliasing is known as antialiasing. One conventional mechanism for antialiasing is known as an accumulation buffer (A-buffer) technique. In such a conventional system, an A-buffer replaces the z buffer 17. FIG. 3 depicts a conventional method 40 for utilizing the A-Buffer technique for a particular polygon. Data for each pixel 31 in each polygon is processed in step 42, thereby providing a fragment for each pixel 31 that the polygon covers. A fragment includes data for a portion of a particular polygon that covers the pixel 31 with which the fragment is also associated. Typically, step 42 is performed polygon by polygon. In step 42, a mask is also provided for each pixel in each polygon. The mask indicates the extent of the polygon in the particular pixel 31. The fragments for the polygon are then inserted into a linked list, via step 44. In step 44, each fragment inserted into the linked list is associated with the corresponding pixel. The linked list associates each pixel 31 with a portion of each polygon that would be displayed on the pixel 31. Typically, steps 42 and 44 are performed in a first pass through data for all polygons being rendered on the display. Therefore, steps 42 and 44 are repeated for all polygons, via step 46. Once the fragments have been generated for each polygon and inserted into the linked list, the first pass through the data is completed. The linked list is then traversed in order to accumulate and render data from the polygons associated with each pixel via step 48. In step 48, data is rendered pixel by pixel from the linked list. Step 48 is typically performed in a second pass through the data.

Although the A-buffer technique reduces staircasing, one of ordinary skill in the art will realize that this technique has its drawbacks. In particular, two passes are made through the data in order to render objects to the display. The first pass is to provide the masks for each polygon and to associate the polygons with particular pixels, in steps 42–46. Consequently, the first pass through the data is typically done polygon by polygon. The second pass utilizes the linked list to render the data in pixel order. Because two passes are required, the A-buffer technique is time consuming. The polygons are also rendered in both the A-buffer and the frame buffer 18. Therefore, more memory may be consumed. In addition, the linked list must be managed by the computer graphics system. Consequently, the A-buffer technique is more difficult to implement.

One of ordinary skill in the art will also realize that other conventional antialiasing methods have their drawbacks. Supersampling, which processes data for subpixels in each pixel, provides antialiasing but is time consuming because of the number of calculations involved. Supersampling also consumes more memory because sections containing multiple pixels and, therefore, multiple subpixels, are rendered at a time. Using the blending value of each portion of each polygon to determine the color of a pixel results in edge bleeding, in which the color of the background or obstructed polygons appear to the user. Rendering each polygon multiple times at slightly different positions reduces aliasing but blurs the entire image and requires additional time.

The present invention provides a system and method for generating a graphical image on a display. The graphical image is generated from data describing at least one object. The display includes a plurality of positions. Each of the plurality of positions has an area. The system and method comprise determining if a portion of the at least one object intersects a current position of the plurality of positions and providing an output if the portion intersects the current position. The method and system further comprise providing a mask for the portion if it is determined that the portion intersects the current position. The mask indicates an extent to which the portion occupies the area of current position. The method and system further comprise utilizing the at least one mask to provide antialiasing. The method and system also include repeating the determining, at least one mask providing, and utilizing steps for each of the plurality of positions.

The present invention will be described in terms of a particular computer graphics system and a particular number of subpixels per pixel. However, one of ordinary skill in the art will readily recognize that this method and system will operate effectively for other types of computer graphics systems, masks of other sizes, and other systems not inconsistent with the present invention. The present invention will also be described in the context of a three-dimensional display. However, one of ordinary skill in the art will readily realize that the present invention could be used in rendering two-dimensional scenes. For example, two-dimensional scenes may contain objects that are partially occluded. Occlusion can be described by a layer order. The layer order can be described by a depth value. Deeper layers are occluded by shallow layers. Therefore, in the context of the present invention z represents a depth value. The depth value includes a three-dimensional depth, such as a distance from the viewing plane or a w value, or another type of depth such as layer order.

Figure 4:
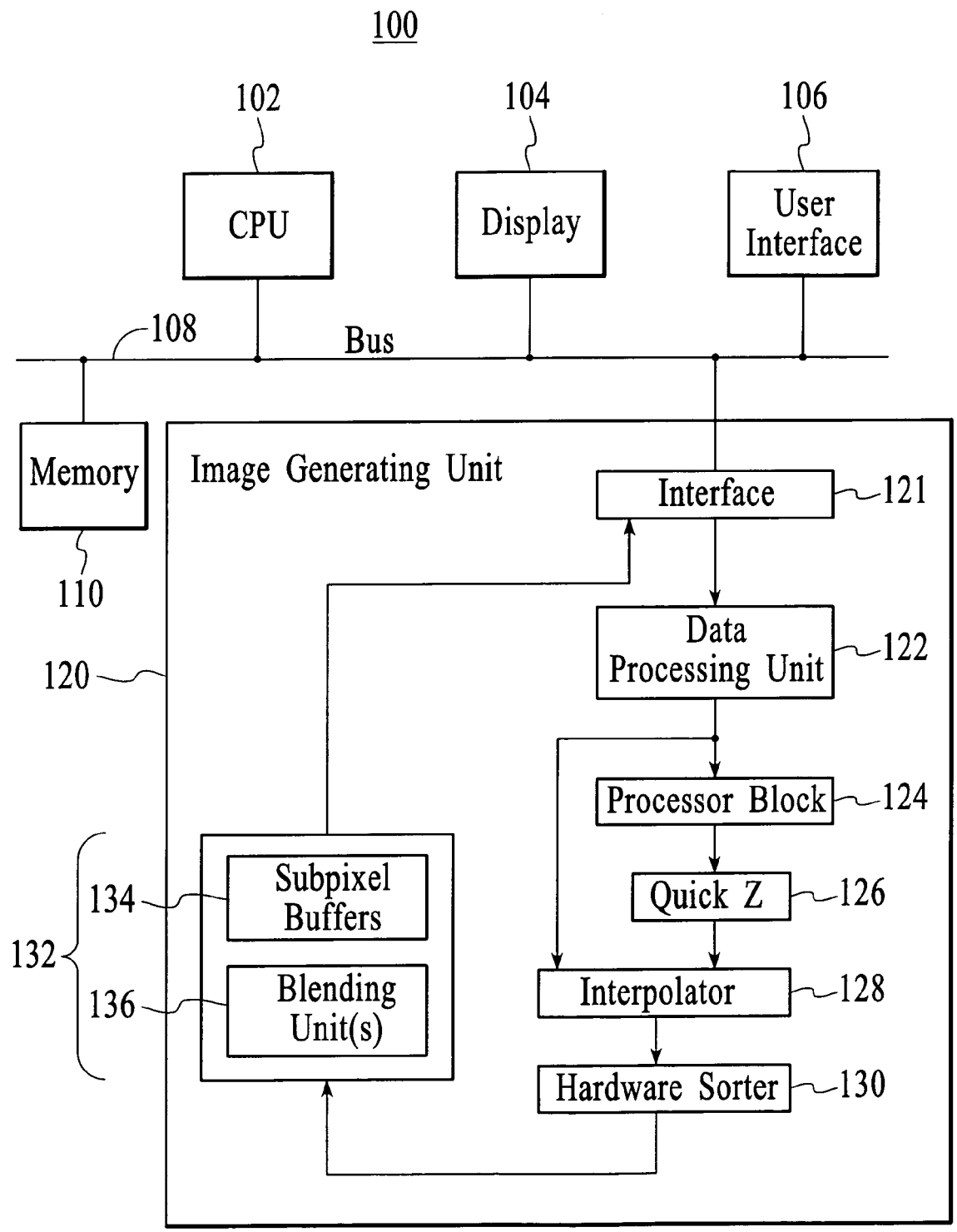
FIG. 4 is a block diagram depicting a computer graphics system in accordance with the present invention.

To more particularly illustrate the method and system in accordance with the present invention, refer now to FIG. 4 depicting a simplified block diagram of one embodiment of a computer graphics system 100 in accordance with the present invention. Portions of the computer system 100 are described more completely in co-pending U.S. patent application Ser. No. 08/624,261 entitled "Method and Apparatus for Identifying and Eliminating Three-Dimensional Objects Visually Obstructed from a Planar Surface". Applicant hereby incorporates by reference the above-mentioned co-pending application. The present invention is also related to co-pending U.S. patent application Ser. No. 08/624,260 entitled "Graphics Processors, System and Method for Generating Screen Pixels in Raster Order Utilizing a Single Interpolator" filed on Mar. 29, 1996. Applicant hereby incorporates by reference the above-mentioned co-pending application.

The computer graphics system 100 includes a central processing unit (CPU) 102, a display 104, a user interface 106 such as a keyboard or mouse or other communicating device, a memory 110, and an image generating unit 120 coupled with a bus 108. The display 104 includes a plurality of pixels, not shown. Each of the plurality of pixels has an area. Note, however, that nothing prevents the method and system from being implemented in a different computer system having other components. The display 104 could include a display memory (not shown) to which pixels are written. For example, the display 104 could include a frame buffer. However, the present invention can also be implemented without a frame buffer. The system 100 is used to display objects, particularly three-dimensional objects. In order to do so, each of the objects is preferably broken into polygons to be used in rendering the objects.

The image generating unit includes an interface 121 connected to the bus 108. The interface 121 transmits data to a data processing unit 122. A processor block 124 is coupled with the data processing unit 122. The processor block 124 identifies data describing portions of polygons ("intersecting polygons") which intersect the area extending along a z-axis from a selected pixel in an x-y plane corresponding to a screen of the display 104. In a preferred embodiment, the processor block 124 includes a processor for each intersecting polygon. The data associated with the portion of the intersecting polygon associated with the selected pixel is termed a fragment. Thus, data relating to each selected pixel includes fragments for each portion of each of the intersecting polygons.

An obstructed object identifier/removal unit 126 receives the fragments from each intersecting polygon associated with the selected pixel and removes fragments for the portions of certain polygons which are obstructed without determining the precise z-value of the polygon. The obstructed object identifier/removal unit 126 is described more completely in co-pending U.S. patent application Ser. No. 08/624,261 entitled "Method and Apparatus for Identifying and Eliminating Three-Dimensional Objects Visually Obstructed from a Planar Surface". The interpolator 128 receives the fragments for the portions of polygons intersecting the particular pixel and interpolates the data, including interpolating texture, color, and alpha values for the fragment. The interpolator 128 also provides a mask, discussed below, for each fragment. Although mask generation can be considered logically distinct from interpolation, the mask is preferably generated by a sub-block (not shown) of the interpolator 128. However, in an alternate embodiment, mask generation can be provided by another unit. The mask can be considered part of the data relating to each portion of each of the intersecting polygons. Thus, the mask is part of the fragment for each portion of each of the intersecting polygons. The interpolator 128 provides the fragments for each of the remaining intersecting polygons to a hardware sorter 130. The hardware sorter is more completely described in co-pending U.S. patent application Ser. No. 09/583,063 entitled "Method and System for Providing a Hardware Sort in a Graphics System" filed on May 30, 2000. Applicant hereby incorporates by reference the above-mentioned co-pending application. The hardware sorter 130 sorts the fragments for the intersecting polygons based on the value of a key associated with the fragment. Preferably, the key is the z value, or depth value, for the fragment at the selected pixel. Note, however, that the present invention is consistent with other sorts or with no sort. The sorted fragments for each pixel are then provided to a buffer 132. In a preferred embodiment, the buffer 132 includes subpixel buffers 134 and a blending unit 136. However, in an alternate embodiment, multiple blending units 136 can be used. Preferably, the data for the pixels is provided to the buffer 132 in the order in which the pixels will be displayed. Preferably, this order is in raster order on the display 104.

Figure 5:
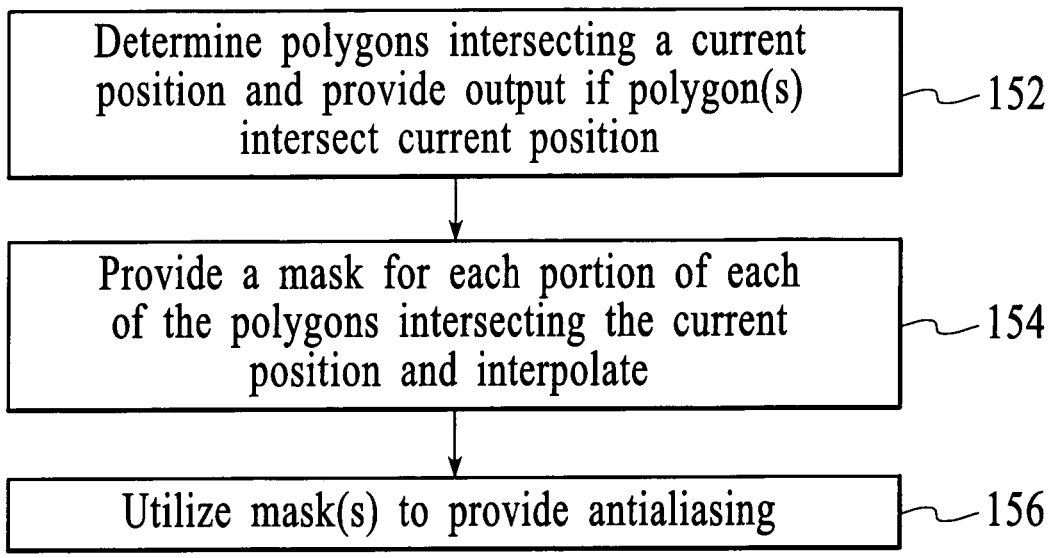
FIG. 5 is a flow chart depicting a method for providing a graphical display including antialiasing in accordance with the present invention.

FIG. 5 depicts one embodiment of a method 150 for providing antialiasing in accordance with the present invention. It is determined if a portion the polygons for objects to be displayed intersects a current position, via step 152. Thus, in step 152, the portions of the intersecting polygons are determined for the current position. Also via step 152, an output is provided if at least one portion of a polygon intersects the current position. The current position is preferably a current pixel. In a preferred embodiment, the processor block 124 performs step 152. A mask is then provided via step 154. In a preferred embodiment, a mask is provided for each portion of each polygon that intersects a current position. The mask indicates the extent to which the portion of the intersecting polygon occupies the area of the current pixel. The fragments for each portion of each intersecting polygon may also be interpolated in step 154 to provide other information relating to the current pixel. The information provided includes the mask for each portion of each intersecting polygon. The masks are then utilized to provide antialiasing via step 156. Steps 152 through 156 are then repeated for each pixel remaining in the display 104, via step 158.

Figure 6:
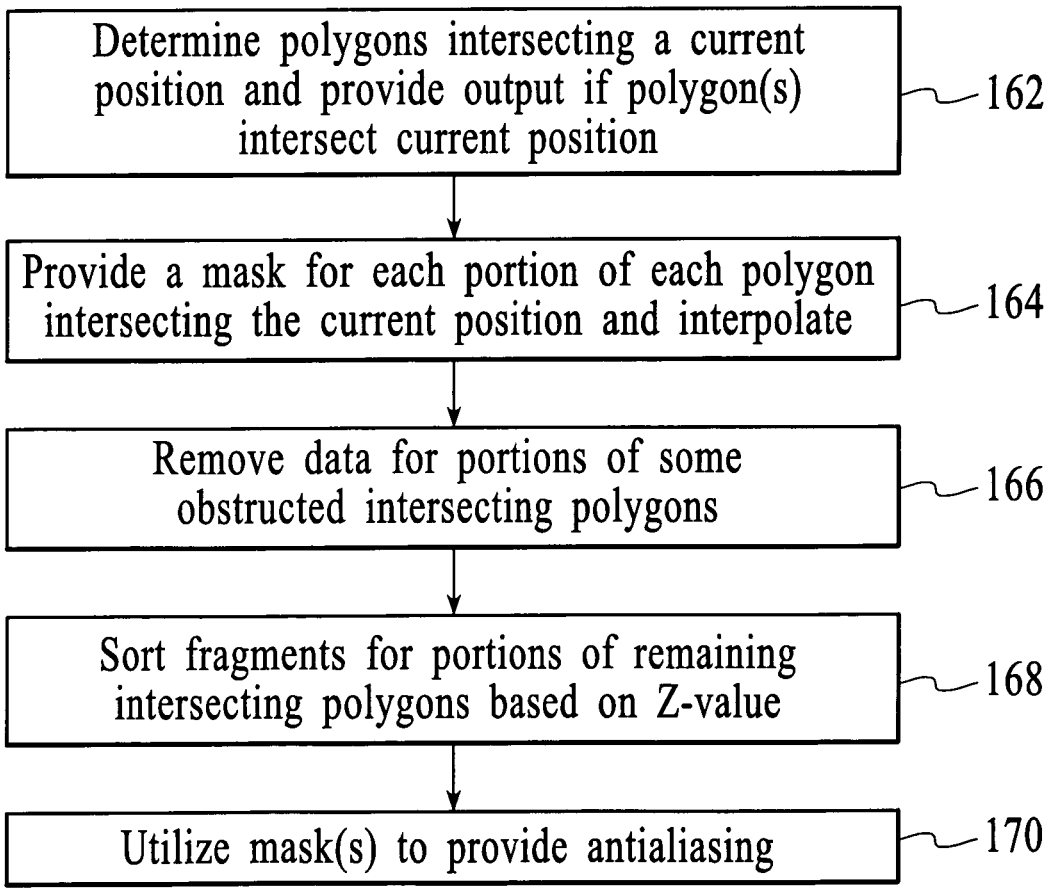
FIG. 6 is a more detailed flow chart depicting a method for providing a graphical display including antialiasing in accordance with the present invention.

FIG. 6 depicts a more detailed flow chart of a method 160 for providing antialiasing in accordance with the present invention. Note that the order of steps in the method 160 can be changed. Furthermore, some steps can be omitted. It is determined if portions of polygons for objects to be displayed intersect a current position, via step 162. Thus, in step 162, the portions of the intersecting polygons are determined. Also via step 162, an output is provided if the at least one portion of a polygon intersects the current position. The current position is preferably a current pixel. In a preferred embodiment, step 162 includes providing fragments for polygons that intersect the current pixel. Also in a preferred embodiment, the processor block 124 performs step 162. A mask is then provided via step 164. The mask indicates the extent to which the portion of the intersecting polygon occupies the area of the current pixel. Also in step 164, the fragments for each portion of each intersecting polygon are interpolated to provide information relating to the current pixel. The information provided includes the mask for each portion of each intersecting polygon. Fragments for portions of some obstructed intersecting polygons are then removed via step 166. Preferably, this is accomplished without determining an exact z-value for the portion of the intersecting polygon. Thus, step 166 is preferably performed by the obstructed object identifier/removal unit. The fragments for the remaining intersecting polygons are then sorted via step 168. In an alternate embodiment, step 168 may be performed before step 164 of providing the masks. The fragments sorted include the mask for each remaining intersecting polygon.

The masks provided in steps 154 or 166 can be explained with reference to FIGS. 7A through 7C. FIG. 7A depicts a pixel 200 of the display 104. As discussed above, each pixel 200 has an area. The pixel 200 includes sixteen subpixels 201 through 216. There are two polygons 220 and 222 which intersect the pixel 200. Thus, polygons 220 and 222 are portions of intersecting polygons, each of which covers a part of the pixel 150.

FIG. 7B depicts a mask 230 for the first polygon 222. The mask 230 contains ones in subpixels 203, 207, and 210–216. Although shown as empty, the subpixels 201, 202, 204–206 and 208–209 may contain zeroes. The positions of the ones in subpixels 203, 207, and 210–216 indicate where the polygon 222 exists. Thus, the mask 230 also indicates the location of the edges of the portion of the intersecting polygon.

FIG. 7C depicts a mask 240 for a second polygon 220. The mask 240 contains ones in subpixels 204, 206–207, and 210–216. Although shown as empty, the subpixels 201–203, 204–205 and 209 may contain zeroes. The positions of the ones in subpixels 204, 206–207, and 210–216 indicate where the portion of the polygon 220 exists. Thus, the mask 240 also indicates the location of the edges of the portion of the intersecting polygon.

FIG. 8 depicts a more detailed flow chart of one embodiment 180 of the step 156 or the step 170 of utilizing the mask(s) to provide antialiasing. The method 180 is preferably used for all fragments provided from the hardware sorter 130. For each subpixel 201 through 216, the masks are used to blend the fragments for the portions of the intersecting polygon, via step 182. In a preferred embodiment, this blending is performed using a different subpixel buffer 134 in the buffer 132 for each subpixel 201 through 216. In the preferred embodiment, a blending unit 136 aids in performing the blending in step 182. However, in an alternate embodiment, another number of blending units 136 can be used. For example, one blending unit could be used for each subpixel buffer 134. Also in a preferred embodiment, sixteen subpixels and, therefore, sixteen subpixel buffers 134 are utilized. Each separate buffer retains data for polygons that have a one in the mask for the subpixel corresponding to the subpixel buffer 134. In a preferred embodiment, blending is accomplished using the data, such as blending values, in the fragments for each intersecting polygon. When the blending step 182 is completed, each subpixel buffer 134 includes the blended data for all intersecting polygons contributing to the subpixel corresponding to the subpixel buffer 134. The data for each of the subpixels 201 through 216 residing in the subpixel buffers 134 is then summed via step 184. The data is then divided by the number of subpixels, via step 186. In an alternate embodiment, the method 180 could combine pixels 131 in another manner. For example, another filter, such as sinc filter, could be used. The subpixels 202–216 could overlap, rather than being adjacent. Non-adjacent subpixels are particularly advantageous when used with a sinc filter. Thus, the appropriate data for the pixel 200 is provided.

For example, for the pixel 200, the masks 230 and 240 may be used in step 182 to blend data for polygons 220 and 222 which intersect the pixel 200. Data for the two polygons 220 and 222 will be blended in subpixels 207 and 210 through 216. This is because the masks 230 and 240 indicated that the polygons 220 and 222 overlap in these subpixels. In a preferred embodiment, the data for polygons 220 and 222 is combined using the blending values. In another embodiment, some other blending function might be used. Data for the polygon 222 will be retained in subpixel 203. Data for the polygon 220 will be retained in subpixel 204. The remaining subpixels 201, 202, 205, 206, and 209 retain the background color. This is because there are no polygons at these subpixels. The data retained for each of the subpixels 201 through 216 would then be summed and averaged via steps 184 and 186, respectively.

FIG. 9 depicts a more detailed flow chart of one embodiment of a method 190 for performing step 182, using masks to blend data for portions of intersecting polygons. Blending is considered to have a source and a destination. Data from the source is blended with data residing in the destination. In the method 190, the source is a fragment for a polygon which intersects a pixel currently being processed. For a fragment of an intersecting polygon, the corresponding mask is used to determine the destinations, via step 192. The destinations are the subpixel buffers 134 for which the mask has a one. As discussed above, each subpixel buffer 134 preferably corresponds to a particular subpixel 210 through 216. Using data in the fragment, such as the blending value, the fragment is blended with the data in each of the destinations, via step 194. Thus, the blending step 194 accounts for whether particular fragment being blended is translucent or opaque. In addition, in a preferred embodiment, fragments are provided from the hardware sorter 130 from the highest to lowest z value. Consequently, the z value and whether the fragment obstructs a fragment having a higher z value may also be accounted for in the blending step 194. Via step 196, steps 192 and 194 are repeated for each fragment provided from the hardware sorter 130. Thus, the data for fragments for polygons intersecting a pixel is blended. The blended data for the subpixels 201 through 216 can then be averaged and provided to the display 104. Alternatively, each subpixel 201–216 could have a color buffer and a z buffer (not shown). When combining fragments for multiple pixels, a z compare could be performed first.

Because the methods 150 and 160, particularly steps 156 and 170, aliasing is reduced. Because data for subpixels 201 through 216 is used, the benefits of supersampling are achieved. Thus, a more accurate rendering of the objects to be displayed are provided and aliasing reduced. Moreover, the methods 150 and 160 do not suffer from the drawbacks of conventional antialiasing methods. For example, because masks 230 and 240 are used to determine which data for subpixels 201 through 216 should be used in antialiasing, the method 150 and 160 are simpler than conventional supersampling. The pixels are also rendered in raster order using only one pass through the data for objects to be rendered. Thus, the method 150 or 160 requires fewer passes through the data than the conventional A-buffer technique. In addition, the method 150 or 160 does not require linked lists used by conventional A-buffering. Processing is made easier because managing of linked lists is not required. Furthermore, the amount of memory used is reduced. Unlike using the blending value only in antialiasing, edge bleeding is eliminated because the magnitude of the blending value as well as the intersecting polygon's shape are known. Moreover, since polygons are not rendered multiple times in different positions, the images displayed are not blurred. Thus, antialiasing is performed without many of the drawbacks associated with conventional methods for providing antialiasing.

A method and system has been disclosed for providing antialiasing of objects in a graphical display. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for generating a graphical image on a display from data describing one or more objects, the display including a plurality of positions, each of the plurality of positions having an area, the method comprising the steps of:
    (a) determining if a portion of an object intersects a current position of the plurality of positions and providing an output if the portion intersects the current position;
    (b) providing a mask for the portion if it is determined that the portion intersects the current position, the mask indicating an extent to which the portion occupies the area of the current position;
    (c) using the mask to provide antialiasing;
    (d) repeating steps (a)–(c) for each object; and
    (e) repeating steps (a) through (d) for each of the plurality of positions;
    (f) generating a graphical image based at least upon the antialiasing provided in step (c).

2. The method of claim 1 wherein the current position includes a plurality of subareas, wherein the mask indicates a portion of the plurality of the subareas occupied by the portion and wherein the utilizing step (c) further includes the steps of:
    (c1) using the mask to blend information relating to the portion for the portion of the subareas.

3. The method of claim 2 wherein the utilizing step (c) further includes the steps of:
(c2) summing the information for each of the plurality of subareas to provide a resultant; and
(c3) dividing the resultant by a number of subareas.

4. The method of claim 1 wherein each of the plurality of positions is a pixel and wherein the current position is a current pixel on the display.

5. The method of claim 4 comprising the step of:
(g) removing the portion if the portion is obstructed.

6. The method of claim 5 further comprising the step of:
(h) sorting each portion based on the z-value.

7. The method of claim 6 wherein the repeating step (d) includes
repeating steps (a) though (c) and steps (g) through (h) for each object.

8. A method for generating a graphical image on a display from data describing a plurality of objects, the display including a plurality of positions, each of the plurality of positions having an area, the method comprising the steps of:
(a) determining if a portion of each of the plurality of objects intersects each of the plurality of positions;
(b) providing a mask for each of the plurality of positions that the portion intersects, the mask indicating an extent to which the portion occupies the area of each of the plurality of positions; and
(c) using the mask to provide antialiasing for each of the plurality of positions that the portion intersects.

9. A system for generating a graphical image on a display from data describing an object, the system comprising:
a display including a plurality of positions, each of the plurality of positions having an area;
a processor block coupled with the display, the processor block operable to determine if a portion of the object intersects a current position of the plurality of positions and provide an output if the portion intersects the current position;
an interpolator coupled with the processor block, the interpolator operable to interpolate the data and provide a mask for the portion, the mask indicating an extent to which the portion occupies the area of the current position; and
means for utilizing the mask to provide antialiasing;
wherein the plurality of positions are rendered in raster order.

10. The system of claim 9 wherein the current position includes a plurality of subareas, wherein the mask indicates a portion of the plurality of the subareas occupied by the portion, and wherein the utilizing means further includes:
means for using the mask to blend information relating to the portion for the portion of the subareas.

11. The system of claim 10 further comprising a buffer that is used to sum the information for each of the plurality of subareas to provide a resultant and to divide the resultant by the number of subareas.

12. The system of claim 11 wherein each of the plurality of positions is a pixel and wherein the current position is a current pixel on the display.

13. The system of claim 12 further comprising:
means for sorting a plurality of portions based on the z-value.

14. The system of claim 13 wherein the sorting means further comprises:
an obstructed object identifier/removal unit coupled with the processor block and the interpolator, wherein, in response to the output and without determining a precise axial position of the portion, the obstructed object identifier/removal unit identifies if the portion is visually obstructed and removes data relating to the portion if the portion is obstructed; and
a hardware sorter coupled to the interpolator and the buffer operable to sort the plurality of portions for the current position based on the plurality of portions.

15. A system for generating a graphical image on a display from data describing a plurality of objects, the system comprising:
a display including a plurality of positions, each of the plurality of positions having an area;
an interpolator coupled with the processor block, the interpolator including:
means for utilizing the mask to provide antialiasing
means for determining if a portion of each of the plurality of objects intersects each of the plurality of positions;
means for providing a mask for each of the plurality of positions that the portion intersects, the mask indicating an extent to which the portion occupies the area of each of the plurality of positions; and
means for using the mask to provide antialiasing for each of the plurality of positions that the portion intersects.

* * * * *